United States Patent [19]

Vokurka

[11] 4,323,758
[45] Apr. 6, 1982

[54] UNIVERSAL CONTROL STRUCTURE FOR WELDING DEVICES OF AN AUTOMATIC WELDING MACHINE

[75] Inventor: Franz Vokurka, Vienna, Austria

[73] Assignee: IGM-Industriegeräte und Maschinenfabriks-Gesellschaft mbH, Wiener Neudorf, Austria

[21] Appl. No.: 103,795

[22] Filed: Dec. 14, 1979

[30] Foreign Application Priority Data

Dec. 18, 1978 [AT] Austria .................................. 9026/78

[51] Int. Cl.³ .............................................. B23K 9/28
[52] U.S. Cl. .............................................. 219/125.1
[58] Field of Search ........................ 219/125.1, 124.33; 414/1

[56] References Cited

U.S. PATENT DOCUMENTS

| | | | |
|---|---|---|---|
| 3,119,009 | 1/1964 | Zeller | 219/125.1 |
| 4,151,390 | 4/1979 | Bisiach | 219/124.33 |
| 4,219,723 | 8/1980 | Maezawa et al. | 219/124.33 |

FOREIGN PATENT DOCUMENTS

| | | | |
|---|---|---|---|
| 36795 | 11/1965 | German Democratic Rep. | 219/125.1 |
| 50-38069 | 12/1975 | Japan | 219/125.1 |

Primary Examiner—C. C. Shaw
Attorney, Agent, or Firm—Martin A. Farber

[57] ABSTRACT

An automatic welding machine (robot machine) in which several, for example two, multi-articulated holders for welding guns or pincher welding guns are provided on a beam, which beam is movable in at least two degrees of freedom, which holders are arranged displaceably in the longitudinal direction of the beam.

5 Claims, 3 Drawing Figures

UNIVERSAL CONTROL STRUCTURE FOR WELDING DEVICES OF AN AUTOMATIC WELDING MACHINE

The invention relates to an automatic welding machine and sets the task of further developing the automatic welding machines (robot machines) now in use in an advantageous manner.

The presently known automatic welding machines of the type used for gas-shielded arc welding and for resistance welding are often disadvantageous from the point of view of operative efficiency as compared to specialized welding machines, since they can be equipped with only one welding gun or pincher welding guns.

The automatic welding machine according to the invention is characterized by a beam, which beam, by means of a carrier, is movably supported by a column, whereby the carrier, both in the direction of its longitudinal extent (axis B) as well as in a direction (axis A) perpendicularly thereto and parallel to the longitudinal extent of the column, is displaceably guided on the column so that the beam is displaceable both in a direction perpendicularly (Axis B) to its longitudinal extent (axis C), as well as in a direction (axis A) perpendicular to its longitudinal extent and perpendicular to the longitudinal extension of the carrier (axis B), and on the beam there are provided at least two displaceably guided, multi-articulated holders for welding guns or pincher guns, and drives are provided for displacing the holders on the beams and for swinging the articulations on the holders, for example, for the swinging (axis $\alpha$) of the holders for the deflecting (axis $\beta$) and for the rotation turning (axis $\gamma$) of the welding heads or pincer guns, whereby the drives which are coordinated under the circumstances from time to time to the holders or respectively to the welding guns or the pincher guns for making welding seams (which seams run parallel or symmetrically to each other) are selectively couplable with each other mechanically or electronically.

The robot machine according to the invention thus has three linear principal axes, in which arrangement two holders for welding guns or pincher guns are mounted on the first of these movement axes, which first axis is moved along by the other two axes. By means of this construction of the automatic welding machine according to the invention the possibility exists of simultaneous operation with two guns. In this manner further possibilities are provided in the practical application for the industry to reduce the production costs. Also in the manner that in many cases only one programming needs to be undertaken for both heads, there results a considerable time reduction and an economical use of the automatic welding machine according to the invention.

In that drives which are actuated independently of each other can be provided for displacing the holders on the beam and for the swinging and deflection of the holders as well as for the rotation of the welding heads, even weld seams which are not parallel or not symmetrical to each other can be simultaneously welded with the automatic welding machine according to the invention, assuming that the welding speeds, as they result from the different angles of the weld seams relative to the common axis do not deviate too much from one another. The possibility exists however to adjust the different speeds by means of separately selectable welding outputs or performances.

If, as provided within the framework of the invention the holders on the beam are displaceable and rotatable as well as deflectable by equal paths in opposite or in the same directions by means of drives, which drives are mechanically or electronically coupled with one another, then the holders can be displaced on the beam (axis C) running in the same direction (parallel) or running in opposite directions relative to each other. With this embodiment, workpieces with symmetrical weld seams can be simultaneously welded with two guns, whereby the programming of the automatic welding machine, controlled for example by a computer in connection with a memory, need take place only on one half of the workpiece with one gun. In this manner the programming time and memory capacity of the computer can be conserved. A corresponding situation occurs for the welding of workpieces with seams that run parallel to each other.

Furthermore by means of the displacement of both holders in the same direction, the possibility exists to simultaneously weld two identical workpieces which are arranged next to each other with each one gun respectively.

The automatic welding machine (robot machine) according to the invention therefore provides a number of advantages. Thus with workpieces with symmetrical seams, these can be simultaneously welded, for which the programming need be performed for only one gun. In this fashion approximately 40% of memory capacity can be saved. By means of an additional position memory, in addition it is possible to program the holders selectively either for mirror-(inverted) image or identical image courses.

Additionally, as mentioned, even parts with seams which are non symmetrical and not parallel can be satisfactorily welded by means of the automatic welding machine according to the invention. For this it suffices to provide separate position memories for the two holders, so that the holders can be moved on the beam independently of each other.

The automatic welding machine according to the invention can be distinguished in the manner that the beam and the carrier (axes B and C, respectively) are aligned horizontally and the column (axis A) is aligned vertically.

The operational possibility of the automatic welding machine according to the invention can still be further increased in the manner that the column is rotatably mounted on a pedestal relative to an axis which is parallel to the axis (A).

Additional details of the invention follow from the description of the embodiment example shown schematically in the illustration. It shows that:

Figure 1:
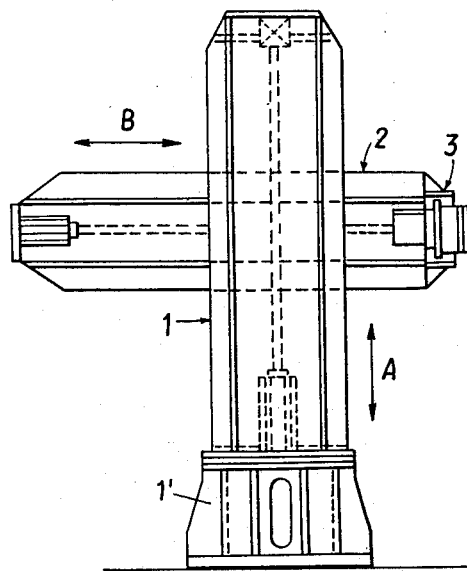
FIG. 1 is a side view of an automatic welding machine.
Figure 2:
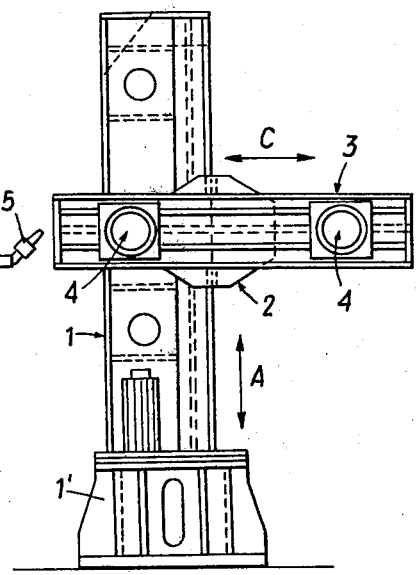
FIG. 2 is a front view of an automatic welding machine.
Figure 3:
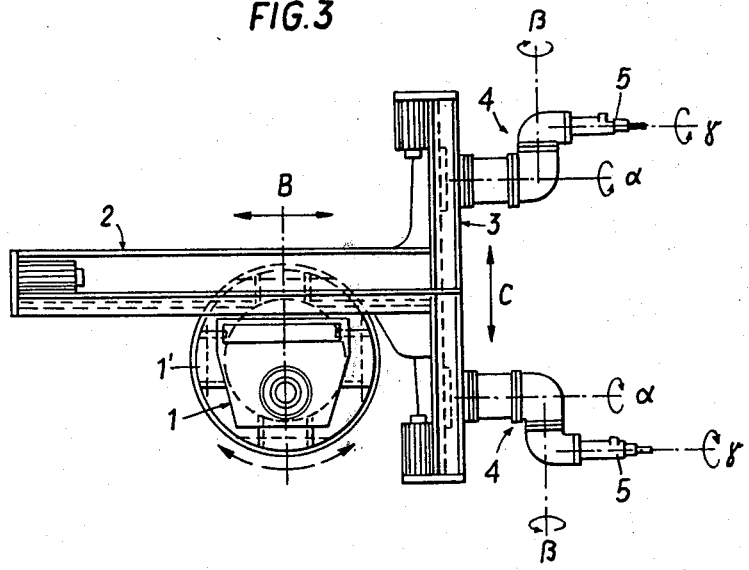
FIG. 3 is a top plan of the automatic welding machine.

The automatic welding machine comprises a column 1, which can be rotatably mounted on a pedestal 1' and which extends approximately in the direction of the axis A. A carrier 2 is displaceably guided on this column 1 in the direction of the axis A. Additionally the carrier 2 is displaceable with respect to the column 1 in the direction of the longitudinal axis B. A beam 3 is rigidly connected with one end of carrier 2, on which beam two holders 4 are displaceably guided in direction of the longitudinal extent of the beam 3 (axis C).

The holders 4 respectively each carry a welding gun 5 and can be swung about the pivot axis $\alpha$ and can be deflected about the pivot axis $\beta$. Additionally the welding guns 5 can be rotated about an axis $\gamma$.

For the execution of the various movements of the automatic welding machine according to the invention, per se customary direct current motors and/or pneumatic drives can be provided. In particular for the movement in the direction of the axes A, B and C, direct-current motors are satisfactory, whereas on the other hand, for movements of the holders about the axes $\alpha$, $\beta$ and $\gamma$, pneumatic or electric drives are provided. Since the execution of the drives as such is not essential to the invention, further details are not gone into.

It is important only that on the beam 3 two holders are provided for the welding guns 5 or pincer guns, which holders are displaceable in the direction of the axis C. The drives for the displacement of the holders 4 can be drives which are independent of each other, which drives can be controlled by separate position memories. This embodiment form will be selected when parts are to be welded, the seams of which are non-symmetrical and do not extend parallel to each other.

The drives for the displacement of the holders 4 along the beam 3 as well as the swinging and deflecting of the holders as well as finally the rotation of the welding guns 5, however, also can be controlled by means of a single position memory. The control thereby can take place such that the movement paths of the welding guns 5 run in mirror image course. In this it is advantageous if the movement of the holders about the pivot axes $\alpha$ and $\gamma$ are controlled by the computer for the second heat, under the circumstances respectively, mirror image or identical image; on the other hand the movements about the axis $\beta$ are always controlled in identical image manner.

If seams which extend parallel to each other, which seams are on one or on two separate workpieces, are to be welded with the automatic welding machine according to the invention, then the control of the drives for the second welding head can take place through the intermediary of a constant or read-only memory via the program which is stored for the other welding head.

I claim:

1. An automatic welding machine, comprising
    a longitudinal column defining an axis A,
    an elongated carrier defining a longitudinal axis B being displaceably mounted on said column in directions along said axis A and B, respectively,
    a beam defining a longitudinal axis C perpendicular to said axes A and B rigidly connected to an end of said carrier, said beam by means of said carrier being movably supported by said column, said carrier is displaceably guided on said column both in the direction of the longitudinal axis B of said carrier as well as in the direction of axis A (perpendicularly to the axis B) such that said beam is displaceable both in a direction axis B (perpendicular to its longitudinal axis C) as well as in a direction axis A (perpendicular to its longitudinal axis C),
    at least two holder means holding welders, respectively, said holder means are independently displaceably, mounted on said beam along said axis C,
    a plurality of articulation means on each of said holder means for swinging, deflection and rotation thereof about axes $\alpha$, $\beta$ and $\gamma$, respectively, thereof,
    a plurality of drive means coordinated to said holder means and respectively to said welders held on said holder means, respectively, for welding seams non-symmetrically, parallel or symmetrically to each other, for displacing said at least two holder means independently and dependently, respectively, on said beam and for moving said articulation means on said holder means for the swinging, deflection and rotation of the articulation means and said welders held on said holder means respectively.

2. The automatic welding machine according to claim 1, wherein
    said beam and said carrier (axes B and C, respectively) are aligned horizontally and said column is aligned vertically.

3. The automatic welding machine according to claims 1 or 2, further comprising
    a pedestal,
    said column is rotatably mounted on said pedestal relative to an axis which is parallel to the axis A.

4. The automatic welding machine as set forth in claim 1, wherein
    said carrier and said beam are formed in one-piece and have a T-shape, with said beam constituting a top of the T-shape.

5. The automatic welding machine as set forth in claim 4, wherein
    three of said drive means are respectively mounted on ends of said T-shape.

* * * * *